United States Patent
Chelba

(10) Patent No.: US 9,612,726 B1
(45) Date of Patent: *Apr. 4, 2017

(54) TIME-MARKED HYPERLINKING TO VIDEO CONTENT

(71) Applicant: Google Inc., Mountain View, CA (US)

(72) Inventor: Ciprian I. Chelba, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/142,750

(22) Filed: Dec. 28, 2013

Related U.S. Application Data

(63) Continuation of application No. 12/412,112, filed on Mar. 26, 2009, now Pat. No. 8,990,692.

(51) Int. Cl.
| | | |
|---|---|---|
| *G06F 3/0481* | (2013.01) | |
| *G06F 3/0484* | (2013.01) | |
| *G06F 17/30* | (2006.01) | |
| *G06F 3/0482* | (2013.01) | |
| *G06F 3/16* | (2006.01) | |
| *G10L 15/08* | (2006.01) | |

(52) U.S. Cl.
CPC .......... *G06F 3/0484* (2013.01); *G06F 3/0481* (2013.01); *G06F 3/0482* (2013.01); *G06F 3/167* (2013.01); *G06F 17/30424* (2013.01); *G10L 15/08* (2013.01)

(58) Field of Classification Search
CPC ............. G06F 3/0484; G06F 17/30424; G06F 3/0482; G06F 3/0481; G06F 3/167; G10L 15/08
See application file for complete search history.

(56) References Cited

U.S. PATENT DOCUMENTS

| | | | |
|---|---|---|---|
| 5,664,227 A | 9/1997 | Mauldin et al. | |
| 5,673,205 A | 9/1997 | Brunson | |
| 5,724,646 A * | 3/1998 | Ganek ................ | H04N 7/17318 348/E7.071 |
| 5,966,121 A | 10/1999 | Hubbell et al. | |
| 6,064,380 A * | 5/2000 | Swenson ........... | G06F 17/30017 707/E17.009 |
| 6,173,287 B1 | 1/2001 | Eberman et al. | |
| 6,912,726 B1 | 6/2005 | Chen et al. | |

(Continued)

OTHER PUBLICATIONS

"Skip", Chambers 21st Century Dictionary. Eds. Mairi Robinson and George Davidson. London: Chambers Harrap, 2001. Credo Reference. Web. Oct. 23, 2015.*

(Continued)

*Primary Examiner* — Steven Sax
(74) *Attorney, Agent, or Firm* — Fenwick & West LLP

(57) ABSTRACT

In one example, a method includes: receiving from a first user interface a first input from a first user specifying a first particular instant in a video other than a beginning of the video; in response to the first input, generating by one or more computer systems first data for inclusion in a link to the video, the first data representing the first particular instant in the video and being operable automatically to direct playback of the video at a second user interface to start at the first particular instant in the video in response to a second user selecting the link at the second user interface; and communicating the first data to a link generator for inclusion in the link to the video.

17 Claims, 4 Drawing Sheets

(56) References Cited

U.S. PATENT DOCUMENTS

| | | | |
|---|---|---|---|
| 8,140,973 B2 | 3/2012 | Sandquist et al. | |
| 2002/0012526 A1* | 1/2002 | Sai | G11B 19/022 |
| | | | 386/241 |
| 2004/0103372 A1 | 5/2004 | Graham | |
| 2006/0117344 A1 | 6/2006 | Lamkin et al. | |
| 2007/0038687 A1* | 2/2007 | Carroll | G06F 17/30073 |
| 2007/0113182 A1* | 5/2007 | Hollemans | G06F 17/30787 |
| | | | 715/723 |
| 2007/0118873 A1 | 5/2007 | Houh et al. | |
| 2007/0192673 A1* | 8/2007 | Bodin | G11B 27/3036 |
| | | | 715/203 |
| 2007/0244902 A1* | 10/2007 | Seide | G06F 17/30796 |
| 2007/0255565 A1* | 11/2007 | Yu | G06F 17/30038 |
| | | | 704/251 |
| 2007/0300258 A1 | 12/2007 | O'Connor et al. | |
| 2008/0077583 A1* | 3/2008 | Castro | G06F 17/3028 |
| 2008/0134033 A1 | 6/2008 | Burns et al. | |
| 2008/0154889 A1 | 6/2008 | Pfeiffer | |
| 2008/0155631 A1 | 6/2008 | Liwerant et al. | |
| 2009/0083787 A1 | 3/2009 | Morris | |
| 2009/0150337 A1 | 6/2009 | Seide et al. | |
| 2009/0162828 A1* | 6/2009 | Strachan | G06F 17/30056 |
| | | | 434/350 |
| 2009/0172545 A1 | 7/2009 | Yokoi | |
| 2009/0193032 A1* | 7/2009 | Pyper | G06Q 30/02 |
| 2009/0193034 A1* | 7/2009 | Hirasaki | G06F 17/30899 |
| 2009/0259943 A1 | 10/2009 | Barsook et al. | |
| 2009/0282454 A1 | 11/2009 | Ekstrand | |
| 2009/0327236 A1* | 12/2009 | Denney | G06F 17/3064 |
| 2010/0042642 A1* | 2/2010 | Shahraray | G06F 17/30884 |
| | | | 707/756 |
| 2010/0138231 A1* | 6/2010 | Linthicum | G06F 19/321 |
| | | | 705/2 |
| 2011/0161348 A1* | 6/2011 | Oron | G06F 17/30781 |
| | | | 707/769 |

OTHER PUBLICATIONS

Buchanan, M. C., et al. "Specifying Temporal Behavior in Hypermedia Documents," Conference on Hypertext and Hypermedia, Proceedings of the ACM conference on Hypertext, 1993, 12 Pages.

Ensha, Azadeh, "How to send YouTube videos with your own cue", Mar. 7, 2009, NY Times, retrieved from the internet at gadgetwise.blogs.nytimes.com/2009/03/07/ on Jul. 12, 2013, 1 pg.

"Get Embedded, Customized, and Clipped links for Youtube Videos with Splicd", Press Release by Splicd, Nov. 1, 2008, 2 pages, retrieved from the internet at http://www.prlog.org/10135524-get-embedded-customized-and-clipped-links-for-youtubevideos-with-splicd.html.

"Synchronized Multimedia Integration Language (SMIL 3.0)," W3C, Dec. 1, 2008, 439 Pages [online] [Retrieved on Jul. 13, 2009] http://www.w3.org/TR/2008/REC-SMIL3-20081201/smil30.html>.

United States Office Action for U.S. Appl. No. 12/412,112, Jun. 10, 2011, 17 pages.

United States Final Office Action for U.S. Appl. No. 12/412,112, Feb. 2, 2012, 21 pages.

United States Office Action for U.S. Appl. No. 12/412,112, Jul. 18, 2013, 17 pages.

United States Final Office Action for U.S. Appl. No. 12/412,112, Jan. 27, 2014, 15 pages.

* cited by examiner

TIME-MARKED HYPERLINKING TO VIDEO CONTENT

CROSS REFERENCE TO RELATED APPLICATIONS

This application is a continuation application of U.S. patent application Ser. No. 12/412,112, filed Mar. 26, 2009, which is incorporated by reference herein in its entirety.

TECHNICAL FIELD

The present disclosure relates generally to hyperlinking.

BACKGROUND

A first user may direct a second user to a video over the Internet by communicating to the second user a hyperlink to the video. The first user may communicate the hyperlink to the second user, for example, by e-mail or instant message (IM) or by inserting it into a web page or document accessible to the second user. The second user may click on or otherwise select the hyperlink (or an element, such as hypertext or a graphical element, embedding the hyperlink) and a web browser (such as GOOGLE CHROME) of the second user may fetch a web page (such as a web page of the domain YOUTUBE.COM) that the hyperlink points to. The web page may contain a video player that automatically or in response to input from the second user (such as the second user clicking on or otherwise selecting the video player in the web page) starts playing the video from the beginning of video.

SUMMARY

In one embodiment, a method includes: receiving from a first user interface a first input from a first user specifying a first particular instant in a video other than a beginning of the video; in response to the first input, generating by one or more computer systems first data for inclusion in a link to the video, the first data representing the first particular instant in the video and being operable automatically to direct playback of the video at a second user interface to start at the first particular instant in the video in response to a second user selecting the link at the second user interface; and communicating the first data to a link generator for inclusion in the link to the video.

DESCRIPTION OF EXAMPLE EMBODIMENTS

Figure 1:
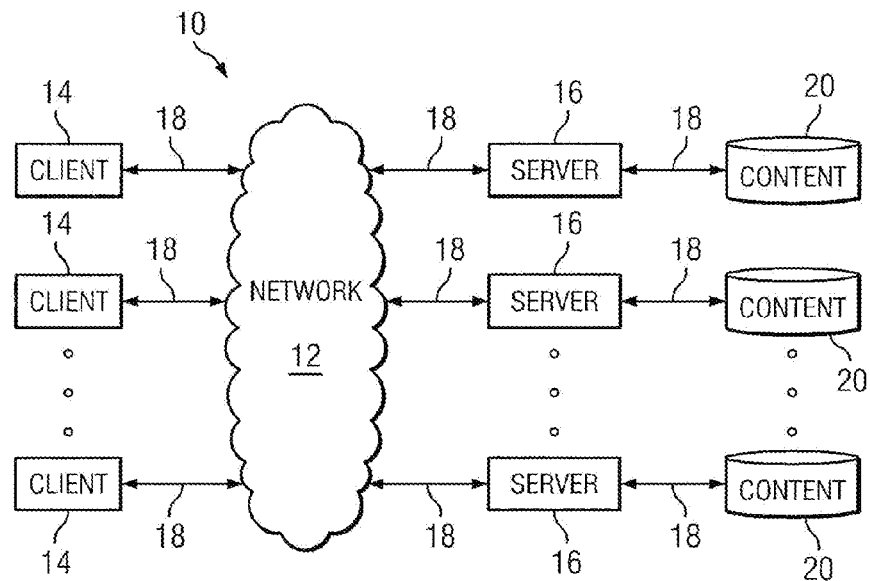
FIG. 1 illustrates an example system for time-marked hyperlinking to video content.

FIG. 1 illustrates an example system 10 for time-marked hyperlinking to video content. In particular embodiments, a hyperlink is a coded reference to another location, such as a web page. The hyperlink may appear as a link, for example, in an e-mail, an IM, a web page, or a document. In addition or as an alternative, an element (such as hypertext or a graphical element) may embed the hyperlink. A user may click on or otherwise select the hyperlink or the element embedding the hyperlink and a web browser or other software application of the user may fetch automatically a web page that the hyperlink points to. Herein, reference to a hyperlink encompasses a link, and vice versa, where appropriate. System 10 includes a network 12 coupling one or more clients 14 and one or more servers 16 to each other. In particular embodiments, network 12 is an intranet, an extranet, a virtual private network (VPN), a local area network (LAN), a wireless LAN (WLAN), a wide area network (WAN), a metropolitan area network (MAN), a portion of the Internet, or another network 12 or a combination of two or more such networks 12. The present disclosure contemplates any suitable network 12. Links 18 couple clients 14 and servers 16 to network 12 and couple servers 16 to one or more databases of content 20. In particular embodiments, one or more links 18 each include one or more wireline, wireless, or optical links. In particular embodiments, one or more links 18 each include an intranet, an extranet, a VPN, a LAN, a WLAN, a WAN, a MAN, a portion of the Internet, or another link 18 or a combination of two or more such links 18. The present disclosure contemplates any suitable links 18. A link 18 may include one or more links 18.

In particular embodiments, a client 14 may enable a user at client 14 to access content 20 via one or more servers 16 and enable the user to communicate with one or more other users at one or more other clients 14. Reference to a client 14 may encompass a user at client 14, and vice versa, where appropriate. A client 14 may be a computer system (such as a desktop or notebook computer system), a personal digital assistant (PDA), or a mobile telephone or other suitable client 14. A client 14 may include one or more clients 14. A client 14 may receive input from and communicate output to a user at client 14. As examples and not by way of limitation, client 14 may receive input from the user by way of a keyboard, mouse, or touch-screen and communicate output to the user by way of a display. Clients 14 need not be the same throughout system 10. One or more first clients 14 may differ from one or more second clients 14. The present disclosure contemplates any suitable combination of any suitable clients 14.

A client 14 may have a web browser, such as GOOGLE CHROME. A user at client 14 may click on or otherwise select a hyperlink (or an element, such as hypertext or a graphical element, embedding the hyperlink) in an e-mail, an IM, a web page, or a document, and a Uniform Resource Locator (URL) or other address in the hyperlink may direct the web browser to a particular server 16 (which may be web servers). The hyperlink may include other information in addition to a URL or other address. The web browser may generate a Hyper Text Transfer Protocol (HTTP) request and communicate the HTTP request to server 16. Server 16 may accept the HTTP request and communicate to client 14 one or more Hyper Text Markup Language (HTML) files responsive to the HTTP request. Client 14 may render a web page from the HTML files from server 16 for presentation to the user. The present disclosure contemplates any suitable web page files. As an example and not by way of limitation, web pages may render from HTML files, Extensible HyperText Markup Language (XHTML) files, or Extensible Markup Language (XML) files, according to particular needs. Such pages may also execute scripts such as, by way of example and not by way of limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The present disclosure contemplates any suitable web pages. As an example and not by way of limitation, a web page hosted by a server 16 may be static or dynamic. In particular embodiments, multiple web pages stored together in a common directory at a server 16 make up a website or a portion of a website. In particular embodiments, a web page includes one or more elements. As an example and not by way of limitation, presented (or rendered) elements of a web page may include static text, static images, animated images, audio, video, interactive text, interactive illustrations, buttons, hyperlinks, or forms. Such elements may each occupy a particular space on the web page when displayed. Internal (or hidden) elements of a web page may include, for example and not by way of limitation, comments, meta elements, databases, diagramation and style information, and scripts, such as JAVASCRIPT. One or more elements of a web page may be inline frames (IFrames) which enable web developers to embed HTML documents into other HTML documents. Herein, reference to a document may encompass a web page, where appropriate. Reference to an element of a web page may encompass one or more portions of a web page file for rendering the element, and vice versa, where appropriate.

A server 16 may be a web or other server providing access to content 20. Content 20 may reside at one or more databases accessible to one or more servers 16. Herein, reference to content encompasses audio, static images, video, web pages, and other content, where appropriate. A server 16 may be unitary or distributed, spanning multiple computer systems or multiple datacenters. The present disclosure contemplates any suitable servers 16. A server 16 may include one or more servers 16. In particular embodiments, one or more servers 16 each include one or more servers or other computer systems for hosting web pages or particular elements of web pages. As described above, a server 16 may host HTML files or other file types, or may dynamically create or constitute files upon a request, and communicate them to clients 14 in response to HTTP or other requests from clients 14. In particular embodiments, a web browser at a client 14 may render a web page from one or more HTML files received from one or more servers 16. In particular embodiments, a server 16 may render a web page and then serve the rendered web page to a client 14 for display. When a web page renders, the browser or the server rendering the web page may retrieve one or more elements of the web page from one or more servers 16 providing access to particular content 20. As an example, multiple servers 16 operated by a single publisher may host elements of web pages of the publisher. For example, the publisher may operate one or more first servers 16 for video, one or more second servers 16 for text, one or more third servers 16 for images, and one or more fourth servers 16 for advertisements. Servers 16 operated by the publisher may serve the domain of the publisher. When a web browser at a client 14 renders a web page, the web browser may retrieve and load one or more elements of the web page from one or more servers 16, as directed by one or more HTML or other files for rendering the web page. The web browser may retrieve and load one or more video files in the web page from one or more databases containing video.

Figure 2:
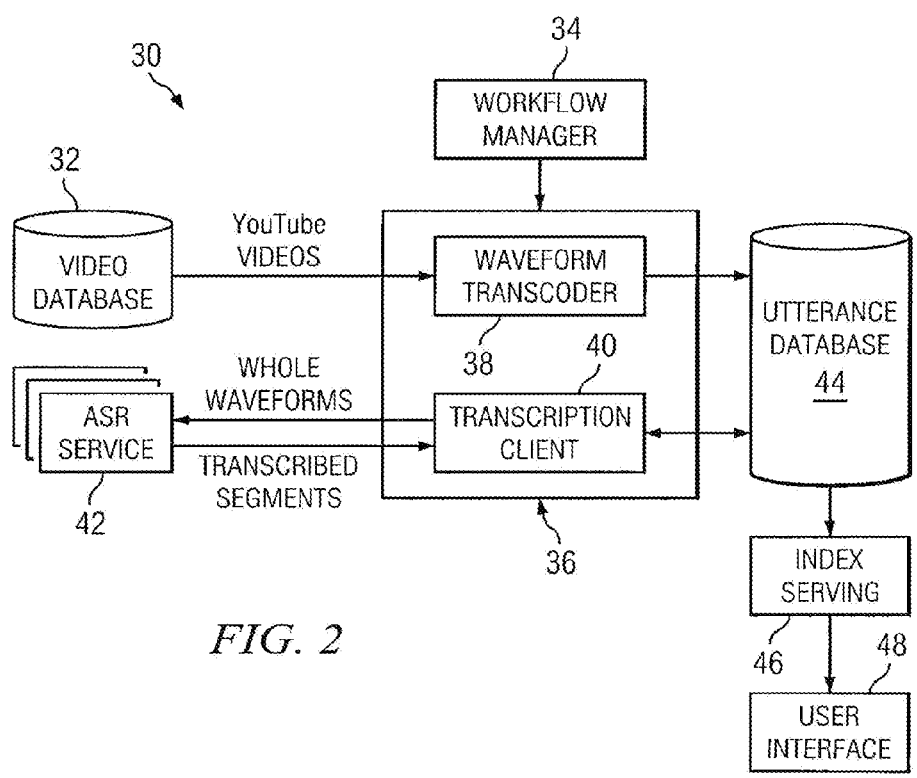
FIG. 2 illustrates an example workflow system for audio indexing.

FIG. 2 illustrates an example workflow system 30 for audio indexing. In particular embodiments, one or more servers 16 may use audio indexing from workflow system 30 to respond to generate particular web pages for communication to clients 14 or otherwise respond to particular requests from clients 14, as described below. One or more videos available to clients 14 via servers 16 may be long and the information in them may be dense, which may make it difficult for a user at a client 14 to find videos that are particularly relevant to the user and identify portions of those videos that are particularly relevant to the user. Audio indexing may make this task easier by facilitating search and navigation of video material based on content. In particular embodiments, transcription and indexing of new video material facilitates searching and a user interface facilitates navigating through search results. In workflow system 30, an inventory of videos (such as YOUTUBE videos) resides in database 32. For every video in the inventory, database 32 contains the title, the description entered by an owner of the video, and a number of formats and locations where the video is available. Workflow system 30 periodically scans database 32 for changes (such as additions or deletions) of entries in a corpus of video material of interest, and workflow manager 34 coordinates actions of audio subsystem 36. Audio subsystem includes one or more waveform transcoders 38 and one or more transcription clients 40. A waveform transcoder 38 may extract audio signals from new videos, as directed by workflow manager 34, and downsample them to a 16-kilohertz sampled, 16-bit linear signal. Workflow manager 34 may keep a queue of transcoded videos processed by a transcription client 40. Transcription clients 40 may transcribe audio by submitting the audio to Automatic Speech Recognition (ASR) service 42. In particular embodiments, ASR service 42 segments the audio, discards music and noise, and applies multipass decoding to the audio to transcribe it. ASR service 42 may run at one or more computer systems in an infrastructure that supports scaling for large-scale processing. Transcription by ASR service 42 may generate a time-aligned transcript and confidence scores for each word in the transcript. The transcript and the scores may be stored in an utterance database 44 (which may be local to workflow system 30) and may serve as the basis for index serving (or information retrieval index) 46. Index serving 46 may facilitate both searching and navigating videos with user interface 48. Although the present disclosure describes and illustrates particular audio indexing, the present disclosure contemplates any suitable audio indexing. In particular embodiments, time-marked hyperlinking to video content utilizes audio indexing. In particular embodiments, time-marked hyperlinking to video content does not utilize any audio indexing.

Figure 3:
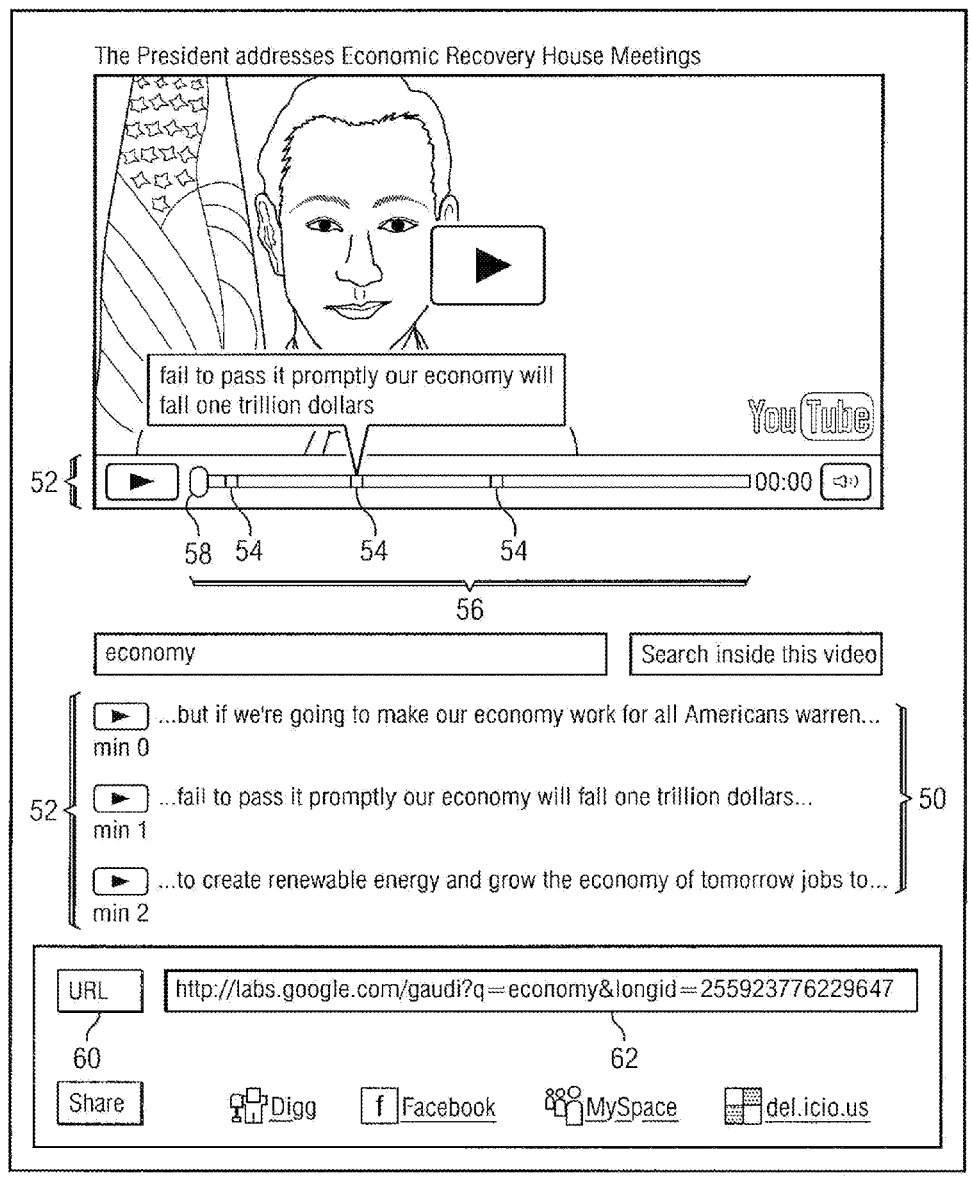
FIG. 3 illustrates an example user interface for time-marked hyperlinking to video content that utilizes audio indexing.

FIG. 3 illustrates an example user interface 48 for time-marked hyperlinking to video content that utilizes audio indexing. User interface 48 may be a Web-accessible user interface. In particular embodiments, a server 16 may generate user interface 48 and communicate it to a client 14 for rendering and display to a user at client 14, where the user may interact with user interface 48. User interface 48, when first displayed to the user, may be an automatically generated HTML page for a default or URL-configured query. Subsequent queries that the user enters into the HTML page may be sent asynchronously by JAVASCRIPT in the HTML page and rendered on the client side without reloading the HTML page. In particular embodiments, user interface 48 may be accessible to a user as an IGOOGLE gadget or through a web page at LABS.GOOGLE.COM. There may be multiple use cases for the transcript of a video in user interface 48. In particular embodiments, user interface 48 may facilitate a user finding a particularly relevant video and navigating to particularly relevant portions of the video. In particular embodiments, user interface 48 may provide an overview of each search result that is sufficient to enable a user to choose among them. In particular embodiments, user interface 48 may more smoothly integrate time-aligned textual information with video playback for more targeted in-video navigation. Each of the search results may list key information about the video—such as thumbnail, title, duration, upload date, and approximate number of spoken mentions. User interface 48 may utilize Asynchronous JAVASCRIPT and Extensible Markup Language (XML) (AJAX) client-side processing, which may enable the user to click or otherwise select each result to see details and start playing the video without navigating away from the results list or reloading the web page.

It may be difficult to integrate output from ASR service 42 with video playback to display all the details provided by the speech recognizer in a useable way. Often, a transcript lacks punctuation or contains errors, making it hard to read. However, the transcript may still improve the video-browsing experience. Particular embodiments apply the concept of a snippet to spoken content, making snippets with bolded hit terms available. As with text snippets, users will most likely only skim them, so a rough transcript will suffice in most cases. For a more detailed overview, particular embodiments may return the ten (or other suitable number of) "best" snippets, selected primarily on the number of token hits in the snippet and the confidence scores associated with those hits.

To facilitate faster video navigation, the snippets may index into the video and provide points to start playback at their occurrences. In particular embodiments, user interface 48 implements this through custom JAVASCRIPT controls of a YOUTUBE video player, enabling any element on the page seek to arbitrary points in the video. In FIG. 3, user interface 48 integrates snippets 50 to player controls 52, which may reduce the amount of space needed to display user interface 48, placing markers 54 on playbar 56 at the start time of each snippet 50. A user may interact with playbar 56 by clicking on or otherwise selecting a particular location along playbar 56 or moving slider 58 to a particular location along playbar 56. Clicking on a marker 54 corresponding to a snippet 50 may initiate playback two seconds before the start time of a first word in snippet 50. This offset may reduce the chance of missing audio that should be in snippet 50 but is not, possibly due to timing imprecision or seeking irregularities. Markers 54 may be yellow or another suitably conspicuous color against playbar 56 and may provide a good one-glance overview of the frequency of the query terms in the video. Because markers 54 correspond to relevant video sections, markers 54 may provide a high-level overview of token hits.

In particular embodiments, playbar 56 is a logical point of integration of text to video timing, but may be less than ideal due to the combination of small playbar size and dense transcript information. Especially for longer videos, a pixel in playbar 56 may encompass ten or even more seconds, which may cause some markers to overlap with each other, taking away from mouseover and browsing interaction with user interface 48. Particular embodiments merge overlapping markers with each other. Particular embodiments may show only one of two or more overlapping snippets and recalculate overlaps if the player is resized. In FIG. 3, user interface 48 utilizes space beneath the video player to provide immediate access to all snippets 50. In particular embodiments, audio indexing facilitates searching within the selected video, which may be especially useful for longer videos, where the localization of information is time consuming. This may be useful to people interested in a particular topic covered in the video or to bloggers or reporters searching for a particular quote. In particular embodiments, user interface 48 enables a user to link to a video with a particular search query filled in.

In particular embodiments, user interface 48 may provide links to the search page as a sharing option. In particular embodiments, user interface 48 enables a user to link to one or more particular instants in a video. As an example and not by way of limitation, a user at user interface 48 may select particular instants in the video and have user interface 48 generate a link to the video that includes data representing the particular instants in the video selected by the user. The user may select a particular instant in the video by left clicking on or otherwise selecting a marker 54 on playbar 56 that user interface 48 has placed there automatically in response to a search inside the video after the user has navigated to the web page containing the video. In addition or as an alternative to user interface 48 placing a marker 54 on playbar 56 in response to a search inside the video after the user has navigated to the web page, user interface 48 may place a marker 54 on playbar 56 in response to a search initiated at another web page that led to the web page. Playbar 56 may already include one or more markers 54 when the user navigates to the web page. In particular embodiments, the user may tag a marker 54 on playbar 56 as a selected instant in the video to distinguish it from other markers 54, which may be of less interest to the user for sharing purposes. The user may tag marker 54 as a selected instant in the video by right clicking on or otherwise selecting marker 54 and, in a pop-up menu that appears in response to the user selection, selecting an appropriate menu option. User interface 48 may change a color of marker 54 (for example from yellow to red) to indicate that the user has tagged it as a selected instant in the video.

In addition or as an alternative to user interface 48 automatically placing markers 54 on playbar 56, the user may manually place one or more markers 54 on playbar 56. In particular embodiments, the user may manually place a marker 54 at a particular location on playbar 56 (which may, for example, correspond to a particular time a particular point in time with respect to one or more of the beginning of the video or an end of the video or a particular frame of the video) by left clicking on or otherwise selecting the particular location on playbar 56 where the user wants marker 54 to be. In addition or as an alternative to a user selecting a location for a marker 54 on playbar 56 by left clicking on playbar 56 at the location on playbar 56 where the user wants marker 54 to be, the user may play the video and, during playback of the video, left click on or otherwise select a designated button or other icon on user interface 48. In response to the user left clicking on or otherwise selecting the designated button or other icon, user interface 48 may place a marker 54 at a location on playbar 56 corresponding to a point in time in the playback of the video when the user left clicked on or otherwise selected the designated button or other icon. In particular embodiments, when a user manually places a marker 54 at a particular location on playbar 56, user interface 48 may automatically move marker 54 back (e.g. toward the beginning of the video) a predetermined amount of time (such as two seconds) to account for a potential time delay between the user recognizing an instant in the video that is of interest to the user and the user selecting a particular location on playbar 56 or selecting a designated button or other icon on user interface 48.

A marker 54 on playbar 56 may correspond to the beginning of a portion of the video that is particularly relevant to the user, e.g., a portion of the video that the user wants to share with one or more other users. In addition or as an alternative, a marker 54 on playbar 56 may correspond to an end of a portion of the video that is particularly relevant to the user. The user may tag a marker 54 as the beginning of a portion of the video that is particularly relevant to the user by right clicking on or otherwise selecting marker 54 and, in a pop-up menu that appears in response to the user selection, selecting an appropriate menu option. Similarly, the user may tag a marker 54 as the end of a portion of the video that is particularly relevant to the user by right clicking on or otherwise selecting marker 54 and, in a pop-up menu that appears in response to the user selection, selecting an appropriate menu option. The present disclosure contemplates any suitable menu option for any suitable tagging of any suitable marker 54, according to particular needs. In particular embodiments, the user may remove a marker 54 from playbar 56 by right clicking on or otherwise selecting marker 54 and, in a pop-up menu that appears in response to the user selection, selecting an appropriate menu option.

In particular embodiments, in addition or as an alternative to markers 54 on playbar 56, user interface 48 may visually indicate particular instants in the video selected by the user by populating a designated area of user interface 48 with text, icons, or both (which may be similar to snippets 50 or player controls 52) representing the particular instants selected by the user. As an example and not by way of limitation, this designated area may be located immediately below snippets 50 in a demarcated space. The text, icons, or both in the designated area may facilitate the user keeping track of particular instants in the video selected by the user.

In particular embodiments, user interface 48 may generate a link (such as, for example, a URL) to the video that includes data representing one or more instants in the video selected by the user. The user may communicate the link to another user and, when the other user clicks on or otherwise selects the link, a web browser or other software application of the other user may fetch automatically a web page that the hyperlink points to. Automatically or in response to input from the other user, instead of the video starting to play from a beginning of the video, the video may start playing for the user at the first of the particular instants in the video represented by the data in the link. If the data in the link includes a stopping point, the video may stop playing once playback of the video has reached the stopping point. User interface 48 may generate a link to the video (with data representing the instants in the video selected by the user) in response to a user selecting a link icon 60. In particular embodiments, a link generator (which may include a hardware, software, or embedded logic component or combination of two or more such components for generating links in response to user input) may generate the link. The link generator may, but need not necessarily, be embedded in user interface 48. User interface 48 may output the link by displaying it in field 62. In particular embodiments, data representing an instant in a video may have the format xxx#AmBs, where "xxx" is a document identifier (ID), "A" represents minutes, and "B" represents seconds. As an example and not by way of limitation, user interface 48 may include the data in a link to a video as follows: http://video.google.com/videoplay?docid=-xxx#AmBs. In particular embodiments, a YOUTUBE link that has, for example, "#t=1m10s" appended to the URL for video playback may allow for playback starting with a given time. Although the present disclosure describes a particular format for data representing an instant in a video for inclusion in a link to the video, the present disclosure contemplates any suitable format for representing an instant in a video for inclusion in any suitable link to the video.

Software supporting user interface 48 (e.g. software providing the functionality of user interface 47 described or illustrated herein) may reside at a client 14, one or more servers 16, or both, according to particular needs. As an example and not by way of limitation, a server 16 may communicate one or more web page or other files to a client 14 and client 14 may render user interface 48 for a user at client 14. Using software residing locally at client 14, client 14 may respond to input provided by the user, including, for example, generating a link to a video that includes data representing one or more instants in a video selected by the user. As another example, a server 16 may communicate one or more web page or other files to a client 14 and client 14 may render user interface 48 for a user at client 14. In response to input provided by the user at client 14, client 14 may communicate requests to server 16. Using software at server 16, server 16 may generate a response (including, for example, a link to a video that includes data representing one or more instants in a video as requested by the user) to the request from Client 14 and communicate the response to client 14 for presentation to the user. The present disclosure contemplates any suitable arrangement between a client 14 and one or more servers 16 or other devices for supporting user interface 48 and carrying out one or more processes underlying the functionality of user interface 48 described or illustrated herein.

Figure 4:
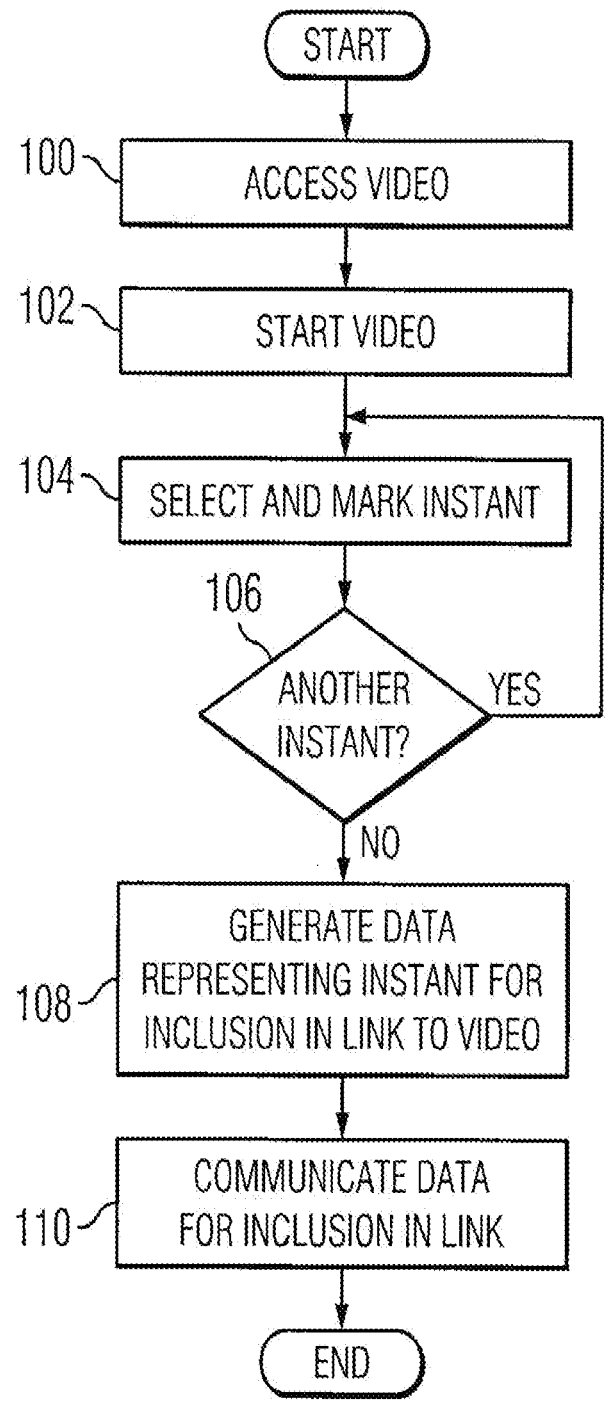
FIG. 4 illustrates an example method for time-marked hyperlinking to video content.

FIG. 4 illustrates an example method for time-marked hyperlinking to video content. At step 100, a user at a client 14 navigates to a YOUTUBE web page and accesses a video on the web page. At step 102, the user clicks on or otherwise selects a player on the web page, causing the video to start playing for the user. As an alternative, the video may start playing automatically once the user has navigated to the web page. At step 104, while the video is playing, when the video reaches a particular instant (which may be of particular interest to the user) the user clicks on or otherwise selects playbar 56 in user interface 48 to mark the particular instant, which may generate a marker 54 on playbar 56 corresponding to the particular instant in the video. The particular instant may be a particular frame of the video, a particular point in time with respect to one or more of the beginning of the video or an end of the video, or a combination of the two. In particular embodiments, user interface 48 automatically rewinds the video a predetermined amount of time (such as, for example, three seconds) to account for a potential delay between the particular instant in the video that is of interest to the user and the user selecting playbar 56 to mark it. The particular instant in the video selected by the user may correspond to the beginning of a particular portion of the video that is of particular interest to the user. At step 106, as the video continues to play, if the video reaches another particular instant of particular interest to the user, the method returns to step 104. The user may select one or more other particular instants in the video. One or more of the other particular instants in the video selected by the user may each correspond to an end of a particular portion of the video that is of particular interest to the user. One or more of the other particular instants in the video selected by the user may each correspond to the beginning of another particular portion of the video that is of particular interest to the user. At step 106, if there are no further particular instants in the video that are of particular interest to the user, the method proceeds to step 108, where user interface 48 generates data representing the one or more particular instants in the video selected by the user for inclusion in a link to the video. In particular embodiments, the data may be formatted as described above. At step 110, user interface 48 communicates the data for inclusion in the link to the video, at which point the method ends.

In particular embodiments, user interface 48 may generate the link and insert the data representing the one or more particular instants in the video selected by the user into the link. In particular embodiments, user interface 48 may communicate the data representing the one or more particular instants in the video selected by the user to a server 16 which may generate the link and insert the data into the link. As described above, the data representing the one or more particular instants in the video selected by the user may be inserted into the link by embedding a data represent a particular instant corresponding to a start time using the following format: http://video.google.com/videoplay?docid=-xxx#AmBs, where "xxx" is a document identifier (ID), "A" represents minutes, and "B" represents seconds. This can direct the playback to commence at A minutes B seconds from the beginning of the video. After the link has been generated and the data representing the particular instants in the video selected by the user have been added to the link, the user may communicate the link to another user, for example, by e-mail, IM, or otherwise. As described above, the other user may receive and click on or otherwise select the link, which may direct a web browser of the user to a web page containing the video. Automatically or in response to input from the other user, the video may start playing for the user at the first of the one or more particular instants in the video represented by the data in the link. If the data in the link includes a stopping point, the video may stop playing once playback of the video has reached the stopping point.

Although the present disclosure describes and illustrates particular steps of the method of FIG. 4 as occurring in a particular order, the present disclosure contemplates any suitable steps of the method of FIG. 4 occurring in any suitable order. Moreover, although the present disclosure describes and illustrates particular components carrying out particular steps of the method of FIG. 4, the present disclosure contemplates any suitable combination of any suitable components carrying out any suitable steps of the method of FIG. 4.

Figure 5:
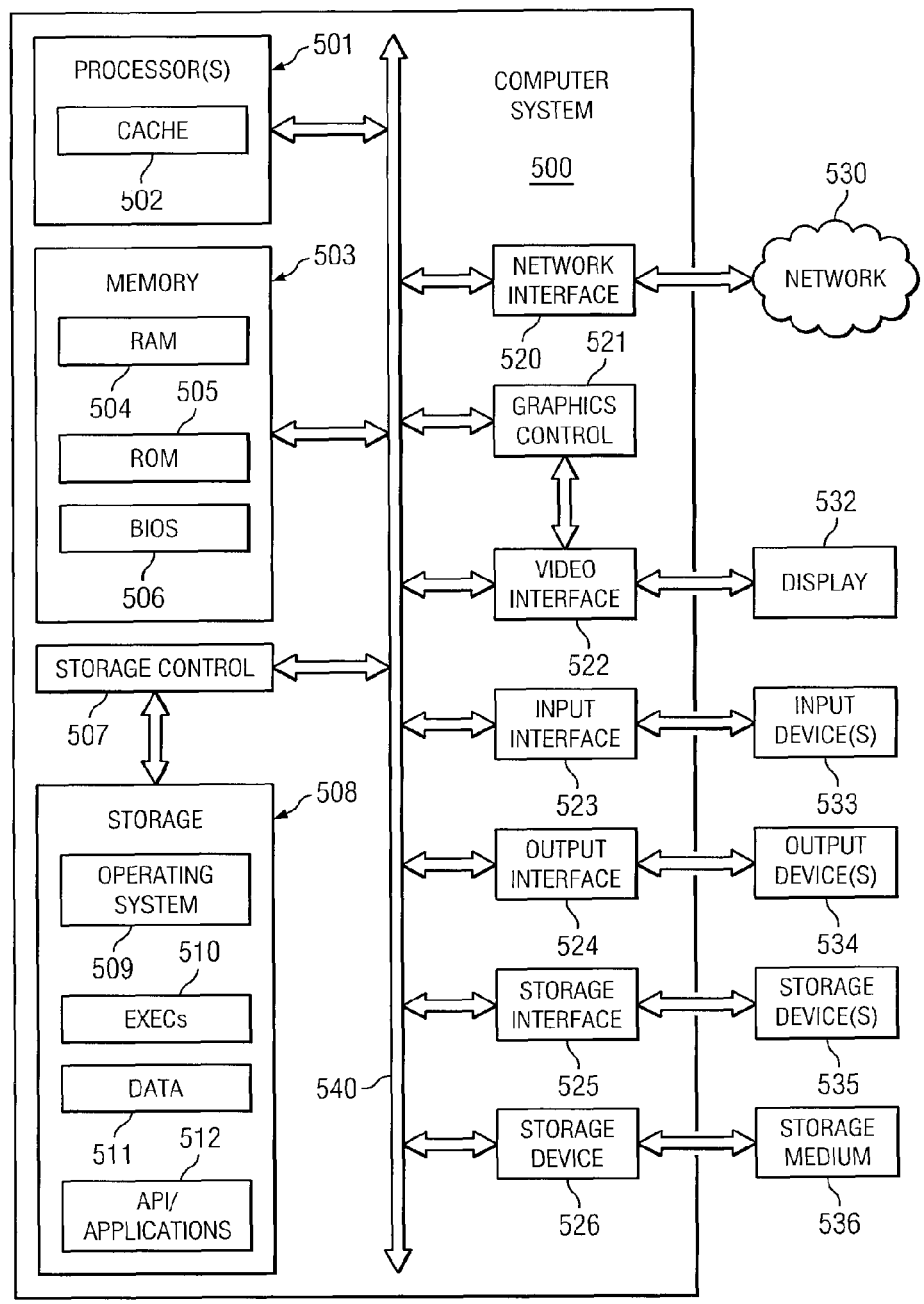
FIG. 5 illustrates an example computer system.

FIG. 5 illustrates an example computer system 500. The components in FIG. 5 are examples only and do not limit the scope of use or functionality of any hardware, software, embedded logic component, or a combination of two or more such components implementing particular embodiments. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers. Computer system 500 includes a display 532, one or more input devices 533 (which may, for example, include a keypad, a keyboard, a mouse, a stylus, etc.), one or more output devices 534 (which may, for example, include one or more speakers), one or more storage devices 535, and various storage media 536.

Bus 540 connects a wide variety of subsystems. Herein, reference to a bus encompasses one or more digital signal lines serving a common function, where appropriate. Bus 540 may be any of several types of bus structures including a memory bus, a peripheral bus, or a local bus using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

Processor(s) 501 (or central processing unit(s) (CPU(s))) optionally contains a cache memory unit 502 for temporary local storage of instructions, data, or computer addresses. Processor(s) 501 are coupled to storage devices including memory 503. Memory 503 includes random access memory (RAM) 504 and read-only memory (ROM) 505. ROM 505 may act to communicate data and instructions unidirectionally to processor(s) 501, and RAM 504 may act to communicate data and instructions bidirectionally with processor(s) 501. ROM 505 and RAM 504 may include any suitable computer-readable media described below. Fixed storage 508 is connected bidirectionally to processor(s) 501, optionally through storage control unit 507. Fixed storage 508 provides additional data storage capacity and may also include any suitable computer-readable media described below. Storage 508 may be used to store operating system 509, EXECs 510, data 511, application programs 512, and the like. Typically, storage 508 is a secondary storage medium (such as a hard disk) that is slower than primary storage. Information in storage 508 may, in appropriate cases, be incorporated as virtual memory in memory 503.

Processor(s) 501 is connected to multiple interfaces, such as graphics control 521, video interface 522, input interface 523, output interface 524, and storage interface 525. These interfaces are in turn connected to appropriate devices, as illustrated. In general, an input/output (I/O) device may be a video display, a track ball, a mouse, a keyboard, a microphone, a touch-sensitive display, a transducer card reader, a magnetic- or paper-tape reader, a tablet, a stylus, a voice or handwriting recognizer, a biometrics reader, another computer systems, or other suitable I/O device or a combination of two or more such I/O devices. Processor(s) 501 may connect to another computer system or to telecommunications network 530 (which may include network 12) through network interface 520. With network interface 520, CPU 501 may communicate with network 530 in the course of performing one or more steps of one or more processes described or illustrated herein, according to particular needs. Moreover, one or more steps of one or more processes described or illustrated herein may execute solely at CPU 501. In addition or as an alternative, one or more steps of one or more processes described or illustrated herein may execute at multiple CPUs 501 that are remote from each other across network 530.

In particular embodiments, when computer system 500 is connected to network 530, computer system 500 may communicate with other devices connected to network 530. Communications to and from computer system 500 may be sent through network interface 520. For example, network interface 520 may receive incoming communications (such as requests or responses from other devices) in the form of one or more packets (such as Internet Protocol (IP) packets) from network 530 and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Particular embodiments include storage with one or more computer-readable media encoding computer-executable code for carrying out computer-implemented operations. The media and computer-executable code may be specially designed or created for particular embodiments or well known and available to a person having ordinary skill in the art. Examples of computer-readable media include, but are not limited to, magnetic media (such as hard disks, floppy disks, and magnetic tape), optical media (such as CD-ROMs and holographic devices), magneto-optical media (such as floptical disks), and hardware devices specially configured to store and execute code, such as application-specific ICs (ASICs), programmable logic devices (PLDs), and ROM and RAM devices. Examples of computer-code include machine code, such as code produced by a compiler, and files containing higher-level code that a computer may execute with an interpreter.

Computer system 500 may provide functionality as a result of processor(s) 501 executing software embodied in one or more computer-readable storage media, such as memory 503. Memory 503 may store software that implements particular embodiments, and processor(s) 501 may execute the software. Memory 503 may read the software from one or more other computer-readable media (such as mass storage device(s) 535) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software. In addition or as an alternative, computer system 500 may provide functionality as a result of logic hardwired or otherwise embodied in a circuit, which may operate in place of or together with software to execute one or more processes or one or more steps of one or more processes described or illustrated herein. Herein, reference to software may encompass logic, and vice versa, where appropriate. Moreover, reference to a computer-readable medium may encompass a circuit (such as an IC) storing software for execution, a circuit embodying logic for execution, or both, where appropriate. The present disclosure encompasses any suitable combination of hardware, software, or both.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   displaying, by a client device in a user interface, a video player playing a video;
   receiving, by the client device via the user interface, a first request to search the video without searching additional videos, the first request including a search query;
   responsive to receiving the first request, displaying, by the client device in the user interface with the video player, a search result indicating a portion of the video that includes accompanying audio that matches the search query, the portion of the video associated with a starting playback time and a stopping playback time;
   displaying within a playbar of the video player, a marker that visually represents the portion of the video;
   displaying, by the client device in the user interface, an interface element and an interface field;
   responsive to receiving a second request to view the portion of the video, skipping playback of the video on the video player from a current time to the starting playback time; and
   responsive to user selection of the interface element, generating a link to the portion of the video and displaying the link in the interface field, the link including information indicating the starting playback time where playback of the video starts in response to user selection of the link and including information indicating the stopping playback time where playback of the video stops in response to user selection of the link and playback of the video reaching the stopping playback time, the video including additional content past the stopping playback time.

2. The method of claim 1, wherein the second request is received based on a user selecting the marker.

3. The method of claim 1, wherein the second request is received based on a user selecting an additional link included in the search result.

4. The method of claim 1, wherein the search result includes a transcript of the audio.

5. The method of claim 1, wherein the link is shared with a plurality of users through the user interface.

6. The method of claim 1, wherein the search result is identified based on an audio index comprising a mapping between a time associated with the portion and text data derived from the portion of the video.

7. A non-transitory computer-readable storage medium having computer-executable instructions that configure one or more processors to perform steps comprising:
   displaying, by a client device in a user interface, a video player playing a video;
   receiving, by the client device via the user interface, a first request to search the video without searching additional videos, the first request including a search query;
   responsive to receiving the first request, displaying, by the client device in the user interface with the video player, a search result indicating a portion of the video that includes accompanying audio that matches the search query, the portion of the video associated with a starting playback time and a stopping playback time;
   displaying within a playbar of the video player, a marker that visually represents the portion of the video;
   displaying, by the client device in the user interface, an interface element and an interface field;
   responsive to receiving a second request to view the portion of the video, skipping playback of the video on the video player from a current time to the starting playback time; and
   responsive to user selection of the interface element, generating a link to the portion of the video and displaying the link in the interface field, the link including information indicating the starting playback time where playback of the video starts in response to user selection of the link and including information indicating the stopping playback time where playback of the video stops in response to user selection of the link and playback of the video reaching the stopping playback time, the video including additional content past the stopping playback time.

8. The computer-readable storage medium of claim 7, wherein the second request is received based on a user selecting the marker.

9. The computer-readable storage medium of claim 7, wherein the second request is received based on a user selecting an additional link included in the search result.

10. The computer-readable storage medium of claim 7, wherein the search result includes a transcript of the audio.

11. The computer-readable storage medium of claim 7, wherein the link is shared with a plurality of users through the user interface.

12. The computer-readable storage medium of claim 7, wherein the search result is identified based on an audio index comprising a mapping between a time associated with the portion and text data derived from the portion of the video.

13. A system comprising:
  one or more processors; and
  a non-transitory computer-readable storage medium having computer-executable instructions that configure the one or more processors to perform steps comprising:
    displaying in a user interface a video player playing a video;
    receiving, via the user interface, a first request to search the video without searching additional videos, the first request including a search query;
    responsive to receiving the first request, displaying in the user interface with the video player, a search result indicating a portion of the video that includes accompanying audio that matches the search query, the portion of the video associated with a starting playback time and a stopping playback time;
    displaying within a playbar of the video player, a marker that visually represents the portion of the video;
    displaying, by the client device in the user interface, an interface element and an interface field;
    responsive to receiving a second request to view the portion of the video, skipping playback of the video on the video player from a current time to the starting playback time; and
    responsive to user selection of the interface element, generating a link to the portion of the video and displaying the link in the interface field, the link including information indicating the starting playback time where playback of the video starts in response to user selection of the link and including information indicating the stopping playback time where playback of the video stops in response to user selection of the link and playback of the video reaching the stopping playback time, the video including additional content past the stopping playback time.

14. The system of claim 13, wherein the search result includes a transcript of the audio.

15. The system of claim 13, wherein the link is shared with a plurality of users through the user interface.

16. The method of claim 1, wherein the link is a Uniform Resource Locator.

17. The method of claim 1, wherein the link includes an identifier associated with the video, the starting playback time, and the stopping playback time.

* * * * *